United States Patent
Lee et al.

(10) Patent No.: US 9,674,143 B2
(45) Date of Patent: Jun. 6, 2017

(54) SECURITY CONTROL APPARATUS AND METHOD FOR CLOUD-BASED VIRTUAL DESKTOP

(71) Applicant: ELECTRONICS AND TELECOMMUNICATIONS RESEARCH INSTITUTE, Daejeon (KR)

(72) Inventors: ChulWoo Lee, Daejeon (KR); ByungJoon Kim, Daejeon (KR); Sung-Jin Kim, Daejeon (KR); HyoungChun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 72 days.

(21) Appl. No.: 14/474,242

(22) Filed: Sep. 1, 2014

(65) Prior Publication Data
US 2015/0326611 A1    Nov. 12, 2015

(30) Foreign Application Priority Data
May 9, 2014 (KR) .................. 10-2014-0055327

(51) Int. Cl.
*H04L 29/06* (2006.01)
*H04L 12/22* (2006.01)
*H04L 12/26* (2006.01)

(52) U.S. Cl.
CPC ......... *H04L 63/0218* (2013.01); *H04L 12/22* (2013.01); *H04L 12/26* (2013.01); *H04L 63/20* (2013.01)

(58) Field of Classification Search
CPC ................................ G06F 21/00; G06F 9/455
(Continued)

(56) References Cited

U.S. PATENT DOCUMENTS

| 2007/0050704 | A1* | 3/2007 | Liu ............... G06F 8/37 715/234 |
| 2008/0320594 | A1* | 12/2008 | Jiang .............. G06F 21/566 726/24 |

(Continued)

FOREIGN PATENT DOCUMENTS

| KR | 10-2000-0054538 A | 9/2000 |
| KR | 10-2011-0051028 A | 5/2011 |
| KR | 10-2012-0062969 A | 6/2012 |

OTHER PUBLICATIONS

Lorenzo Martignoni et al., "Cloud Terminal: Secure Access to Sensitive Applications from Untrusted Systems," The USENIX Annual Tech. Conf., 2012.

*Primary Examiner* — Dede Zecher
*Assistant Examiner* — Dereena Cattungal
(74) *Attorney, Agent, or Firm* — LRK Patent Law Firm

(57) ABSTRACT

The security control apparatus includes a network control unit for receiving a security protocol-based packet that includes a protocol control header and data and that is transmitted between a cloud-based virtual desktop interaction remote agent unit and a virtual machine of a cloud-based virtual desktop interaction device, and blocking network traffic between cloud-based virtual desktop interaction remote agent unit and the virtual machine, depending on received results of checking. A policy checking unit checks whether information extracted from the security protocol-based packet is compliant with control policies, and transmits results of checking to the network control unit. If the information is not compliant with the control policies, a security solution interaction unit transmits the extracted information to an external security solution, and transmits results of checking by a corresponding security solution to the network control unit.

10 Claims, 6 Drawing Sheets

(58) Field of Classification Search
USPC .................................................... 726/23, 29
See application file for complete search history.

(56) References Cited

U.S. PATENT DOCUMENTS

| | | | | |
|---|---|---|---|---|
| 2009/0288167 | A1* | 11/2009 | Freericks | G06F 21/54 726/23 |
| 2009/0328225 | A1* | 12/2009 | Chambers | G06F 21/10 726/26 |
| 2010/0328064 | A1* | 12/2010 | Rogel | G06F 21/56 340/540 |
| 2012/0185913 | A1* | 7/2012 | Martinez | G06F 9/455 726/1 |
| 2012/0304244 | A1* | 11/2012 | Xie | G06F 21/00 726/1 |
| 2014/0237537 | A1* | 8/2014 | Manmohan | G06F 21/53 726/1 |
| 2014/0244851 | A1* | 8/2014 | Lee | H04L 45/54 709/228 |
| 2014/0269329 | A1* | 9/2014 | Hooda | H04L 49/70 370/238 |
| 2014/0380425 | A1* | 12/2014 | Lockett | H04L 63/20 726/4 |

\* cited by examiner

SECURITY CONTROL APPARATUS AND METHOD FOR CLOUD-BASED VIRTUAL DESKTOP

CROSS REFERENCE TO RELATED APPLICATION

This application claims the benefit of Korean Patent Application No. 10-2014-0055327, filed May 9, 2014, which is hereby incorporated by reference in its entirety into this application.

BACKGROUND OF THE INVENTION

1. Technical Field

The present invention relates generally to a security control apparatus and method for a cloud-based virtual desktop and, more particularly, to an apparatus and method that control data to be transmitted in order to minimize the unauthorized leakage of internal data of a cloud and the flow of a malicious file into the cloud, which may occur upon remotely accessing and using a cloud-based virtual desktop environment from a remote location.

2. Description of the Related Art

A cloud-based virtual desktop environment enables a remote user to access and use a virtual desktop computer in a cloud via the Internet. For this, cloud solutions provide virtual desktop interaction protocols such as a PC-over-Internet Protocol (PCoIP) and an Independent Computer Architecture (ICA) protocol, and support data transmission such as that for a file, a printer, or a clipboard, as well as for a screen, a keyboard, or a mouse.

Such a cloud interaction protocol provides a convenient cloud usage environment to a user while also imparting the risk of security threats, such as attacks from the outside of a cloud and the leakage of data to the outside of the cloud. For example, when a remote user transmits internal data from any location to the outside, the risk of leakage of internal data to the outside may occur. Further, when a file with malicious code attached thereto is transferred into the cloud by a user, a serious security threat may be brought into the internal system.

In particular, such a remote interaction protocol provides an encrypted channel. In this case, there is the risk of security threats incurred by bypassing all security equipment located in an area ranging from an external network to an internal cloud-based virtual desktop.

A conventional method of coping with a security threat against the leakage of internal data is a method of prohibiting external equipment such as a Universal Serial Bus (USB) device, from accessing the cloud via the configuration of a virtual desktop. Such a method is advantageous in that the transmission of data between the inside and outside of the cloud is fundamentally disabled, but it is disadvantageous in that users must undergo a lot of inconvenience when using the cloud.

Further, a conventional method of coping with the inflow of malicious code includes a method of installing an antivirus program in a virtual desktop and preventing malicious code from flowing into the cloud. Such a method is advantageous in that the inflow of well-known malicious code may be blocked, but it is disadvantageous in that it is impossible to cope with unknown malicious code, and there is no method of coping with even a case where malicious code incapacitates the antivirus program.

As related preceding technology, Korean Patent Application Publication No. 10-2012-0062969 discloses technology for maintaining the security of user data even in a computing environment in which security is not guaranteed in a host Operating System (OS) such as that of a public computer when it is desired to use a virtualization technology-based desktop environment by means of a hypervisor.

As another related preceding technology, technology for providing a secure virtual desktop environment via separation from a remote operating system in the operation of a virtual desktop is disclosed in the paper ("Cloud Terminal: Secure Access to Sensitive Applications from Untrusted Systems," The USENIX Annual Tech. Conf., 2012, L. Martignoni, P. Poosankam, M. Zaharia, J. Han, S. McCamant, D. Song).

SUMMARY OF THE INVENTION

Accordingly, the present invention has been made keeping in mind the above problems occurring in the prior art, and an object of the present invention is to provide a security control apparatus and method for a cloud-based virtual desktop, which allow a user to control data that is transmitted between the inside and outside of a cloud, in compliance with policies such as user authority, and to block data that is transmitted when the data includes malicious code.

In accordance with an aspect of the present invention to accomplish the above object, there is provided a security control apparatus for a cloud-based virtual desktop, including a network control unit for receiving a security protocol-based packet that includes a protocol control header and data and that is transmitted between a cloud-based virtual desktop interaction remote agent unit and a virtual machine of a cloud-based virtual desktop interaction device, and blocking network traffic between cloud-based virtual desktop interaction remote agent unit and the virtual machine, depending on received results of checking; a policy checking unit for checking whether information extracted from the security protocol-based packet is compliant with control policies, and transmitting results of checking to the network control unit; and a security solution interaction unit for, if it is checked by the policy checking unit that the information is not compliant with the control policies, transmitting the information extracted from the security protocol-based packet to an external security solution and transmitting results of checking by a corresponding security solution to the network control unit.

The policy checking unit may be configured to, if information of the protocol control header of the information extracted from the security protocol-based packet is compliant with the control policies, transmit checking results indicative of permission of transmission of the network traffic to the network control unit.

The policy checking unit may be configured to, if information of the protocol control header of the information extracted from the security protocol-based packet is not compliant with the control policies, transmit checking results indicative of blocking of the network traffic to the network control unit.

The network control unit may prevent transmission of the security protocol-based packet and wait until the results of the checking are received.

The protocol control header may include a type of data, a hash value of a file, user authority information, and user environment information.

The protocol control header may include a protocol name, a protocol virtual channel, a data size, and a packet identifier (ID), attached to the security protocol-based packet.

The control policies may be classified by Internet Protocol (IP), user, and usable function.

The security control apparatus may further include a protocol parsing unit for parsing the security protocol-based packet, extracting the protocol control header information and the data, and transmitting the extracted protocol control header information and data to the policy checking unit.

The security control apparatus may further include a decryption unit for decrypting encrypted data and transmitting the decrypted data to the security solution interaction unit when the data is encrypted data.

The external security solution may include a malicious file identification solution and a data leakage prevention solution.

In accordance with another aspect of the present invention to accomplish the above object, there is provided a security control system for a cloud-based virtual desktop, including a cloud-based virtual desktop interaction remote agent unit for communicating with a virtual machine included in a cloud-based virtual desktop interaction device via security protocol-based communication, and exchanging a security protocol-based packet including a protocol control header and data with the virtual machine; and a security controller for analyzing the security protocol-based packet, blocking inflow of malicious code, and controlling transfer of unauthorized information.

In accordance with a further aspect of the present invention to accomplish the above object, there is provided a security control method for a cloud-based virtual desktop, including receiving, by a network control unit, a security protocol-based packet that includes a protocol control header and data and that is transmitted between a cloud-based virtual desktop interaction remote agent unit and a virtual machine of a cloud-based virtual desktop interaction device; checking, by a policy checking unit, whether information extracted from the security protocol-based packet is compliant with control policies, and transmitting results of checking to the network control unit; if it is checked by the policy checking unit that the extracted information is not compliant with the control policies, transmitting, by a security solution interaction unit, the information extracted from the security protocol based packet to an external security solution, and transmitting, by the security solution interaction unit, results of checking by a corresponding security solution to the network control unit; and blocking, by the network control unit, network traffic between the cloud-based virtual desktop interaction remote agent unit and the virtual machine, depending on results of checking received from the policy checking unit or the security solution interaction unit.

The security control method may further include, after receiving the security protocol-based packet, parsing the security protocol-based packet, extracting the protocol control header information and the data, and transmitting the extracted protocol control header information and data to the policy checking unit.

The security control method may further include, after checking whether the information extracted from the security protocol-based packet is compliant with the control policies and transmitting the results of checking to the network control unit, decrypting encrypted data and transmitting the decrypted data to the security solution interaction unit when the data is encrypted data.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
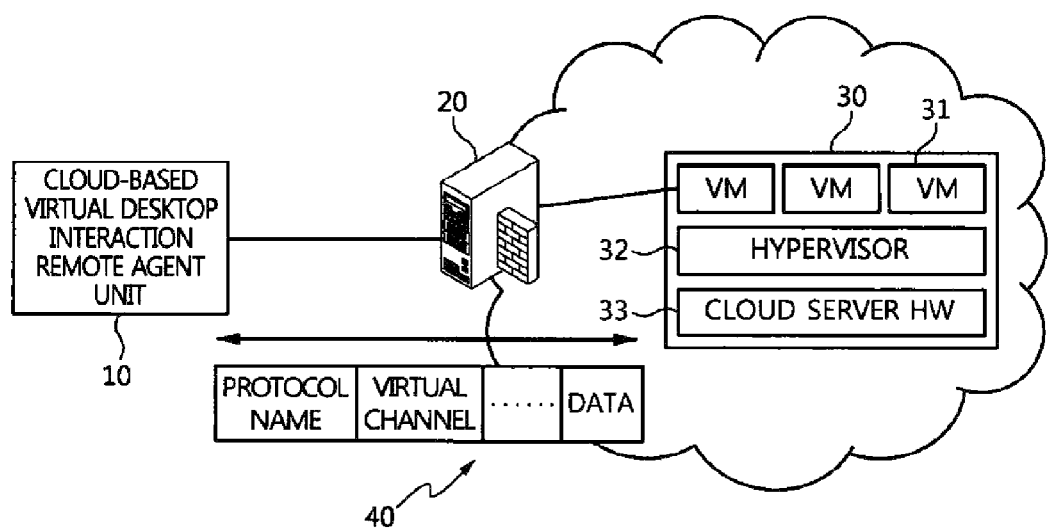
FIG. 1 is a diagram showing a cloud-based virtual desktop environment to which the present invention is applied.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

FIG. 1 is a diagram showing a cloud-based virtual desktop environment to which the present invention is applied.

The cloud-based virtual desktop environment of FIG. 1 includes a cloud-based virtual desktop interaction remote agent unit 10, a security controller 20, and a cloud-based virtual desktop interaction device 30.

The cloud-based virtual desktop interaction remote agent unit 10 is located outside of a cloud and is configured to receive data from the cloud and transmit data to the cloud. The cloud-based virtual desktop interaction remote agent unit 10 may include a mobile phone, a personal computer (PC), or a notebook computer.

The cloud-based virtual desktop interaction remote agent unit 10 communicates with each virtual machine 31 in the cloud-based virtual desktop interaction device 30 via security protocol-based communication. For example, when the cloud-based virtual desktop interaction remote agent unit 10 is a user PC, security protocol-based communication may be performed between the user PC and the virtual machine 31.

The cloud-based virtual desktop interaction remote agent unit 10 functions to transmit, receive, and process information such as that of files, printers, or clipboards.

The security controller 20 is disposed between the cloud-based virtual desktop interaction remote agent unit 10 and the cloud-based virtual desktop interaction device 30.

The security controller 20 analyzes a security protocol-based packet 40 that is exchanged between the cloud-based virtual desktop interaction remote agent unit 10 and the cloud-based virtual desktop interaction device 30, and performs network control such as blocking the inflow of malicious code and controlling the transfer of unauthorized information. The security controller 20 may be regarded as a security control apparatus for a cloud-based virtual desktop.

Here, the security protocol-based packet 40 is defined in order for the security controller 20 to control communication between cloud-based virtual desktop interaction remote agents (that is, the cloud-based virtual desktop interaction remote agent unit 10 and the cloud-based virtual desktop interaction device 30). The security protocol-based packet 40 is present to control data encryption and control the respective functions (e.g., file transmission, printing, clipboard access, etc.) of the agents (that is, the cloud-based virtual desktop interaction remote agent unit 10 and the cloud-based virtual desktop interaction device 30).

The cloud-based virtual desktop interaction device 30 includes virtual machines (VMs) 31, a hypervisor 32, and cloud server hardware 33.

Each virtual machine (VM) 31 is provided to an external user who desires to remotely use a cloud-based virtual desktop service. On the virtual machine 31, a remote agent (not shown) for performing a security protocol-based function is operated.

The hypervisor 32 runs the virtual machine 31 using virtualization technology, and performs management functions such as the deletion or addition of virtual machines.

The cloud server hardware (HW) 33 is an actual physical system for operating the hypervisor 32 and the virtual machine 31 thereon.

In other words, the security controller 20 prevents the transmission of unauthorized data and blocks the inflow of malicious code between the virtual machine 31 of the cloud-based virtual desktop interaction device 30 and the cloud-based virtual desktop interaction remote agent unit 10. In this case, the cloud-based virtual desktop interaction remote agent unit 10 and the virtual machine 31 transmit and receive data in the form of the packet 40 (that is, security protocol-based packet) that includes a protocol control header having information such as a protocol name, a virtual channel, a data size, and a packet identifier (ID). Here, the information of the protocol control header may be regarded as the attribute data of data desired to be transmitted. That is, the cloud-based virtual desktop interaction remote agent unit 10 and the virtual machine 31 transfer both transmission data desired to be transmitted and the attribute data thereof over the network. In this case, since the attribute data includes the attribute values of the transmission data, the security controller 20 may control the transmission of data in conformity with the policies. The attribute data may include the type of data to be transmitted (e.g., a file, a clipboard, a printer, etc.), the hash value of a file, a user's authority information, user environment information (e.g., a location, a terminal, or the like), etc. In other words, the attribute data may include a protocol name, a virtual channel, a data size, a packet ID, etc., or may include, if necessary, the type of data to be transmitted (e.g., a file, a clipboard, a printer, etc.), the hash value of a file, user authority information, user environment information (e.g., a location, a terminal, or the like), etc. Alternatively, the attribute data may include all of a protocol name, a virtual channel, a data size, a packet ID, the type of data to be transmitted (e.g., a file, a clipboard, a printer, etc.), the hash value of a file, user authority information, user environment information (e.g., a location, a terminal, or the like), etc. Such transmission data is encrypted to guarantee the confidentiality of data, and the encrypted transmission data is transmitted with the data divided into packets.

That is, the security controller 20 is located in a network stage between the cloud-based virtual desktop interaction remote agent unit 10 and the virtual machine 31 of the cloud-based virtual desktop interaction device 30, and is configured to parse the packet 40 passing through the network and determine whether to transmit the data, based on the attribute data thereof. Depending on the results of the determination, the security controller 20 may prevent unauthorized information from being leaked to the outside of the cloud. Further, since the security controller 20 transfers the data that is transmitted from the cloud-based virtual desktop interaction remote agent unit 10 to the virtual machine 31, after determining whether the data is malicious, the flow of a malicious file into the cloud may be blocked.

In the above description, although the security controller 20 and the cloud-based virtual desktop interaction device 30 have been described as being independently configured, the security controller 20 may be included in the cloud-based virtual desktop interaction device 30 as occasion demands.

Figure 2:
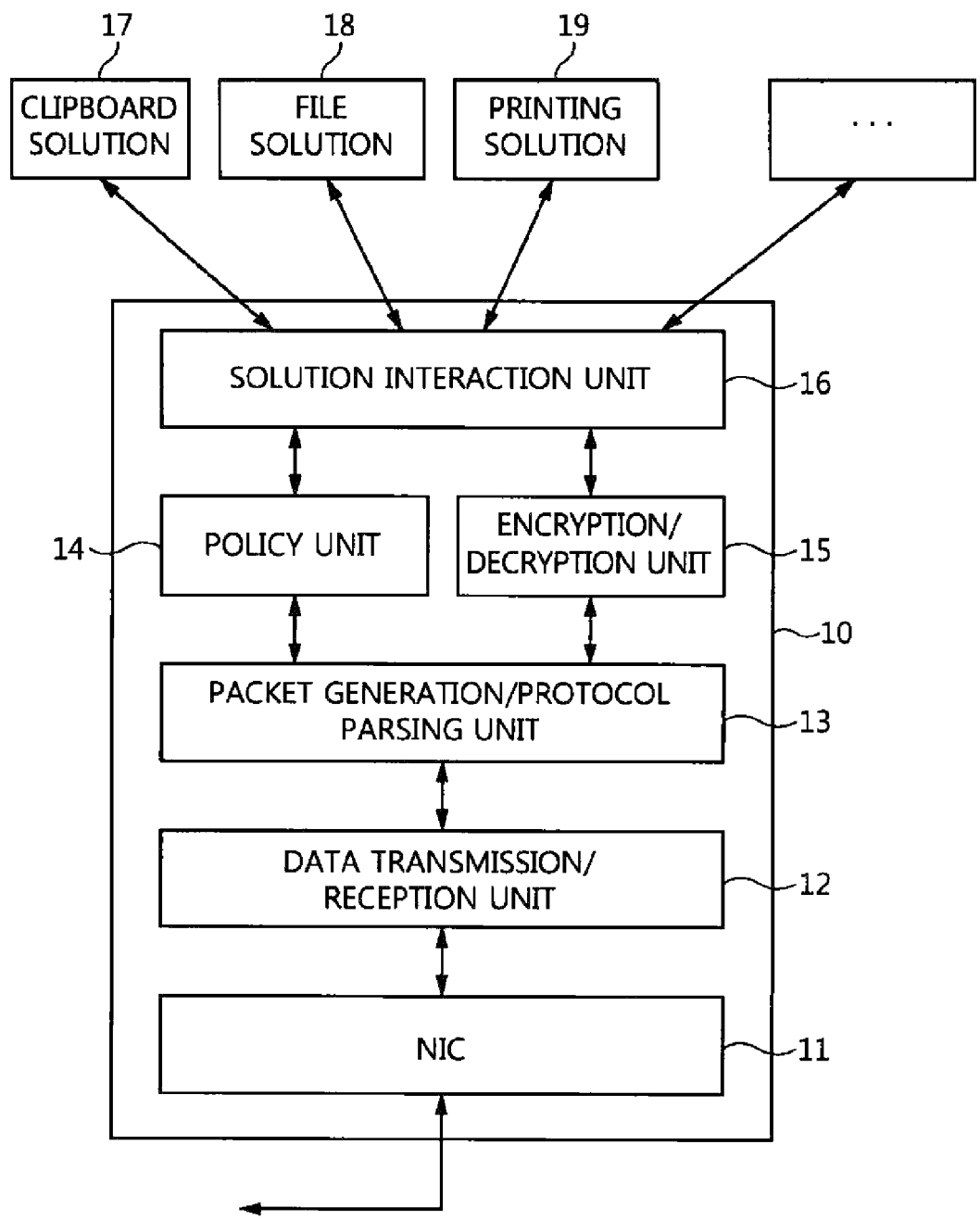
FIG. 2 is a diagram showing the internal configuration of a cloud-based virtual desktop interaction remote agent unit shown in FIG. 1.

FIG. 2 is a diagram showing the internal configuration of the cloud-based virtual desktop interaction remote agent unit 10 shown in FIG. 1.

The cloud-based virtual desktop interaction remote agent unit 10 includes a Network Interface Card (NIC) 11, a data transmission/reception unit 12, a packet generation/protocol parsing unit 13, a policy unit 14, an encryption/decryption unit 15, and a solution interaction unit 16.

The NIC 11 is a hardware network card for exchanging a network packet (e.g., a security protocol-based packet 40).

The data transmission/reception unit 12 transmits and receives data to and from the virtual machine 31 of the cloud-based virtual desktop interaction device 30 through the NIC 11.

The packet generation/protocol parsing unit 13 generates a network packet (that is, the security protocol-based packet 40) in conformity with a security protocol, and parses a received packet 40 in accordance with the rules of the security protocol. That is, the packet generation/protocol parsing unit 13 may generate a protocol control header depending on a user environment for transmission and data characteristics, and may generate a type of transmission packet (that is, the security protocol-based packet 40) in which the protocol control header is combined with the data.

The policy unit 14 checks whether a function request such as a file transmission request, a printing request, or a clipboard access request is compliant with established policies if the function request is received, and then determines whether to transfer the security protocol-based packet 40 desired to be transmitted to the virtual machine 31 of the cloud-based virtual desktop interaction device 30, and whether to transfer decrypted data to an external solution having the corresponding function (that is, one of a clipboard solution 17, a file solution 18, and a printing solution 19).

The encryption/decryption unit 15 encrypts data to be transmitted or decrypts received data.

The solution interaction unit 16 interacts with the external solution (the clipboard solution 17, the file solution 18, or the printing solution 19) of the agent desiring to transmit data using a security protocol. The solution interaction unit 16 transfers the received data to the corresponding external solution (that is, any one of the clipboard solution 17, the file solution 18, and the printing solution 19).

That is, the solution interaction unit 16 may be regarded as an interface taking charge of message-based communication with the external solution (the clipboard solution 17, the file solution 18, or the printing solution 19). The solution interaction unit 16 may receive a message containing desired data from the external solution which desires to transmit or receive data, or transfer data extracted from a received packet to the external solution.

Here, the clipboard solution 17 transmits and receives clipboard information via a security protocol, and registers the clipboard information in a clipboard in the corresponding environment (e.g., a user PC or a virtual machine). The file solution 18 transmits or receives a file via the security protocol, and stores the file in the corresponding environment (e.g., a user PC or a virtual machine). The printing solution 19 identifies a print event produced by the virtual machine 31, and transfers information about the print event to the printer of a remotely connected user PC environment, thus enabling the information to be printed.

Referring to the configuration of FIG. 2, the cloud-based virtual desktop interaction remote agent unit 10 takes charge of the transmission/reception and processing of data. The external solution (the clipboard solution 17, the file solution 18, or the printing solution 19) desiring security protocol-based data transmission makes a transmission request by transferring a message containing data to the solution interaction unit 16. Accordingly, the cloud-based virtual desktop interaction remote agent unit 10 functions to encrypt data and generate and transmit a packet. Upon receiving a packet, the cloud-based virtual desktop interaction remote agent unit 10 parses the received packet in conformity with a security protocol, decrypts the parsed data, and transfers the decrypted data to the external solution (the clipboard solution 17, the file solution 18, or the printing solution 19).

In the specification of the present invention, although the configuration of FIG. 2 has been described as that of the cloud-based virtual desktop interaction remote agent unit 10, it may be considered that the same configuration as that of FIG. 2 is also included in the virtual machine 31 of the cloud-based virtual desktop interaction device 30.

Figure 3:
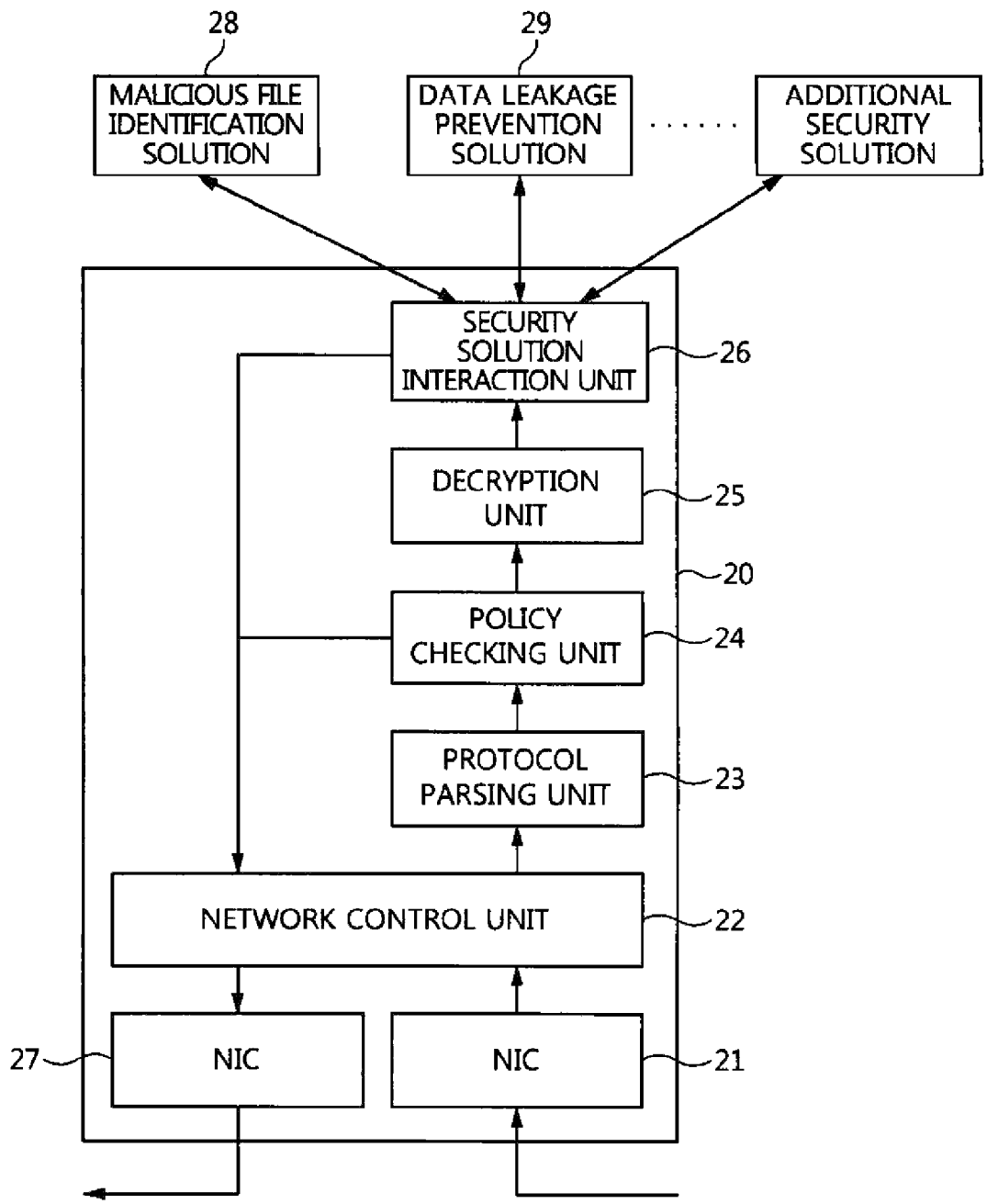
FIG. 3 is a diagram showing the internal configuration of a security controller shown in FIG. 1.

FIG. 3 is a diagram showing the internal configuration of the security controller 20 shown in FIG. 1.

The security controller 20 includes Network Interface Cards (NICs) 21 and 27, a network control unit 22, a protocol parsing unit 23, a policy checking unit 24, a decryption unit 25, and a security solution interaction unit 26.

The NICs 21 and 27 are hardware network cards for exchanging a network packet (e.g., the security protocol-based packet 40).

The network control unit 22 functions to identify network traffic to be checked, and upload the identified network traffic to an upper module so as to check the network traffic. In this case, the upper module of the network control unit 22 may be any of the protocol parsing unit 23, the policy checking unit 24, the decryption unit 25, and the security solution interaction unit 26.

Meanwhile, the network control unit 22 prevents the transmission of the corresponding network traffic and waits until the results of the checking are received from the policy checking unit 24 and/or the security solution interaction unit 26. The network control unit 22 blocks the corresponding network traffic depending on the results of the checking.

The protocol parsing unit 23 parses the corresponding packets so as to check network traffic (that is, network traffic communicated using a security protocol) received from the network control unit 22, and extracts information (that is, the information of a protocol control header or encrypted data).

The policy checking unit 24 checks whether the network traffic is compliant with control policies, based on the information extracted by the protocol parsing unit 23. In this case, the control policies are classified by Internet Protocol (IP), user, or usable function (printing, file transmission or clipboard access), and the determination of whether the network traffic has passed, the respective items of the checking, whether to perform a thorough check, etc. may be applied to the checking of the control policies.

The policy checking unit 24 immediately transfers a message indicative of the permission of transmission to the network control unit 22, with respect to network traffic compliant with the control policies.

The decryption unit 25 sends information extracted by the protocol parsing unit 23 to the upper module (that is, the security solution interaction unit 26) so as to perform a thorough check on network traffic which could not pass the policy checking performed by the policy checking unit 24. In this case, the decryption unit 25 decrypts the encrypted data present in the packet 40, and transmits the decrypted data to the security solution interaction unit 26.

The security solution interaction unit 26 transfers check target information to a security solution (a malicious file identification solution 28, a data leakage prevention solution 29, or an additional security solution) capable of performing a thorough check and yielding the results of the check, receives the check results, and notifies the network control unit 22 whether to block the network traffic.

In this case, the malicious file identification solution 28 checks whether data to be transmitted contains a malicious file. The data leakage prevention solution 29 checks whether the data to be transmitted contains confidential data, protected data, etc.

Referring to configuration diagram of FIG. 3, the security controller 20 checks the policies of network traffic and relays the network traffic via the two NICs 21 and 27. After the network packets that use a security protocol have been filtered by the network control unit 22, a policy check procedure sequentially leading to protocol parsing, policy checking, decryption, and security solution interaction is performed. It is determined whether to permit the passing of the corresponding network packets by means of the checking of internal policies and interaction with an external security solution (the malicious file identification solution 28, the data leakage prevention solution 29, or the additional security solution). The packets permitted to pass are transmitted to a destination through the network control unit 22.

Figure 4:
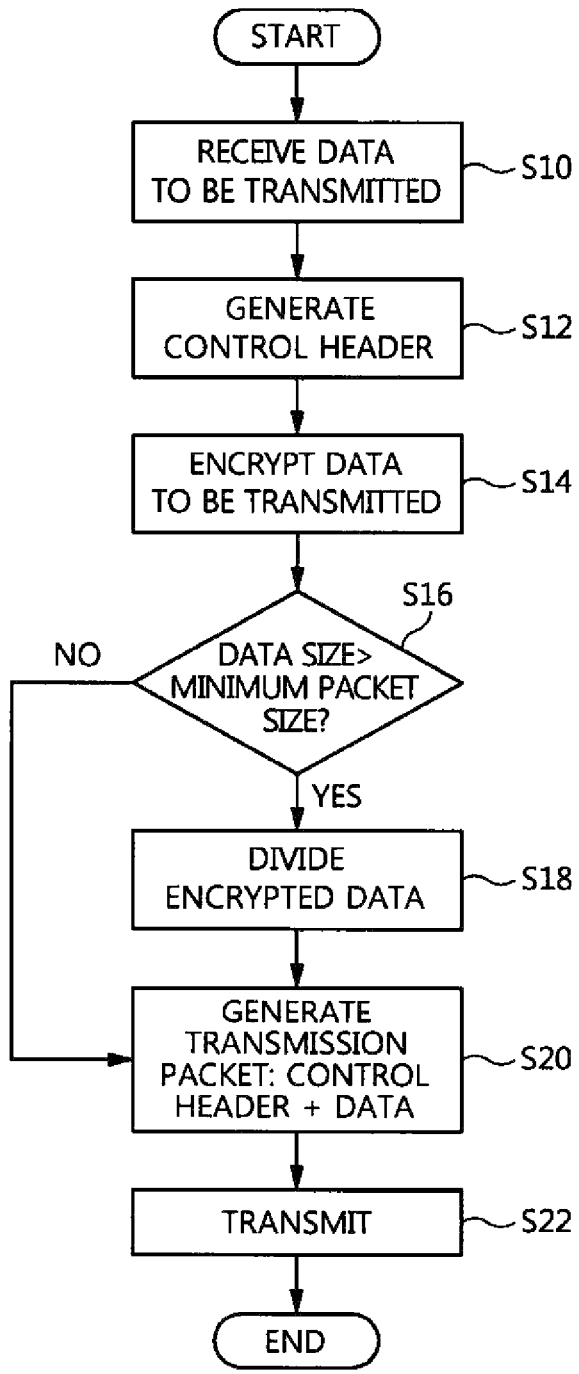
FIG. 4 is a flowchart showing a process in which the cloud-based virtual desktop interaction remote agent unit shown in FIG. 1 generates and transmits a transmission packet.

FIG. 4 is a flowchart showing a process in which the cloud-based virtual desktop interaction remote agent unit shown in FIG. 1 generates and transmits a transmission packet. That is, FIG. 4 may be regarded as illustrating a process in which the cloud-based virtual desktop interaction remote agent unit 10 transmits a security protocol-based packet 40 to the cloud-based virtual desktop interaction device 30. However, FIG. 4 may also be regarded as illustrating a process in which the cloud-based virtual desktop interaction device 30 transmits a security protocol-based packet 40 to the cloud-based virtual desktop interaction remote agent unit 10.

In the following description of FIG. 4, a description will be made on the assumption that the cloud-based virtual desktop interaction remote agent unit 10 transmits a security protocol-based packet 40 to the cloud-based virtual desktop interaction device 30. Further, a description will be made on the assumption that a user who manipulates the cloud-based virtual desktop interaction remote agent unit 10 requests a function such as a file transmission function.

First, the cloud-based virtual desktop interaction remote agent unit 10 receives data to be transmitted through the NIC 11 and the data transmission/reception unit 12 at step S10.

Then, the packet generation/protocol parsing unit 13 of the cloud-based virtual desktop interaction remote agent unit 10 generates a packet 40 based on a security protocol, depending on the data to be transmitted. First, a protocol control header to be included in the packet 40 is generated at step S12.

Further, the encryption/decryption unit 15 of the cloud-based virtual desktop interaction remote agent unit 10 encrypts the data to be transmitted, and sends the encrypted data to the packet generation/protocol parsing unit 13 at step S14. In this case, as a file transmission function request is received, the policy unit 14 of the cloud-based virtual desktop interaction remote agent unit 10 checks whether the encrypted data is compliant with established policies, and then determines whether the transmission of packets is possible. Here, it is assumed that it has been determined that the transmission of the packets is possible. The policy unit 14 sends the results of determination to the packet generation/protocol parsing unit 13.

Thereafter, the packet generation/protocol parsing unit 13 determines whether the size of the encrypted data is greater than a minimum packet size at step S16.

As a result of the determination, if the size of the encrypted data is greater than the minimum packet size, the packet generation/protocol parsing unit 13 divides the encrypted data by the minimum packet size at step S18. In contrast, if the size of the encrypted data is less than or equal to the minimum packet size, there is no need to divide the encrypted data by the minimum packet size.

Then, the packet generation/protocol parsing unit 13 generates a packet 40 to be transmitted, wherein the above-generated protocol control header is combined with the encrypted data to form the packet 40 to be transmitted.

Thereafter, the packet 40 to be transmitted, which is generated by the packet generation/protocol parsing unit 13, is transmitted through the data transmission/reception unit 12 at step S22.

When a description is briefly made, the cloud-based virtual desktop interaction remote agent unit 10 and the virtual machine 31 generates a security control header from the data to be transmitted, encrypts the data, divides the encrypted data by the minimum packet size, and transmits the header and the divided data together.

Figure 5:
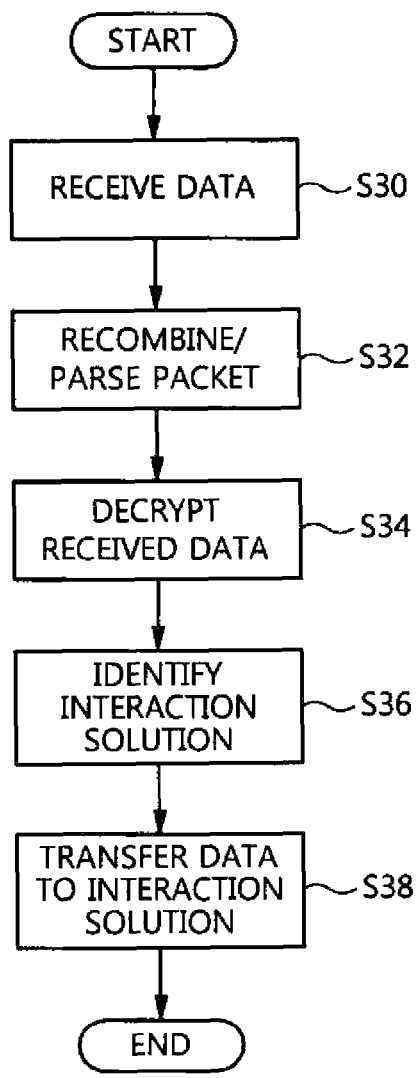
FIG. 5 is a flowchart illustrating a process in which the cloud-based virtual desktop interaction device shown in FIG. 1 receives and processes data.

FIG. 5 is a flowchart illustrating a process in which the cloud-based virtual desktop interaction device shown in FIG. 1 receives and processes data.

First, the virtual machine 31 of the cloud-based virtual desktop interaction device 30 receives packet-type data from the cloud-based virtual desktop interaction remote agent unit 10 at step S30.

Next, the virtual machine 31 recombines the received packet-type data into an original packet and parses the original packet at step S32, and decrypts the received data at step S34.

Thereafter, the virtual machine 31 identifies an interaction solution at step S36, and transfers the data to the identified interaction solution at step S38.

Figure 6:
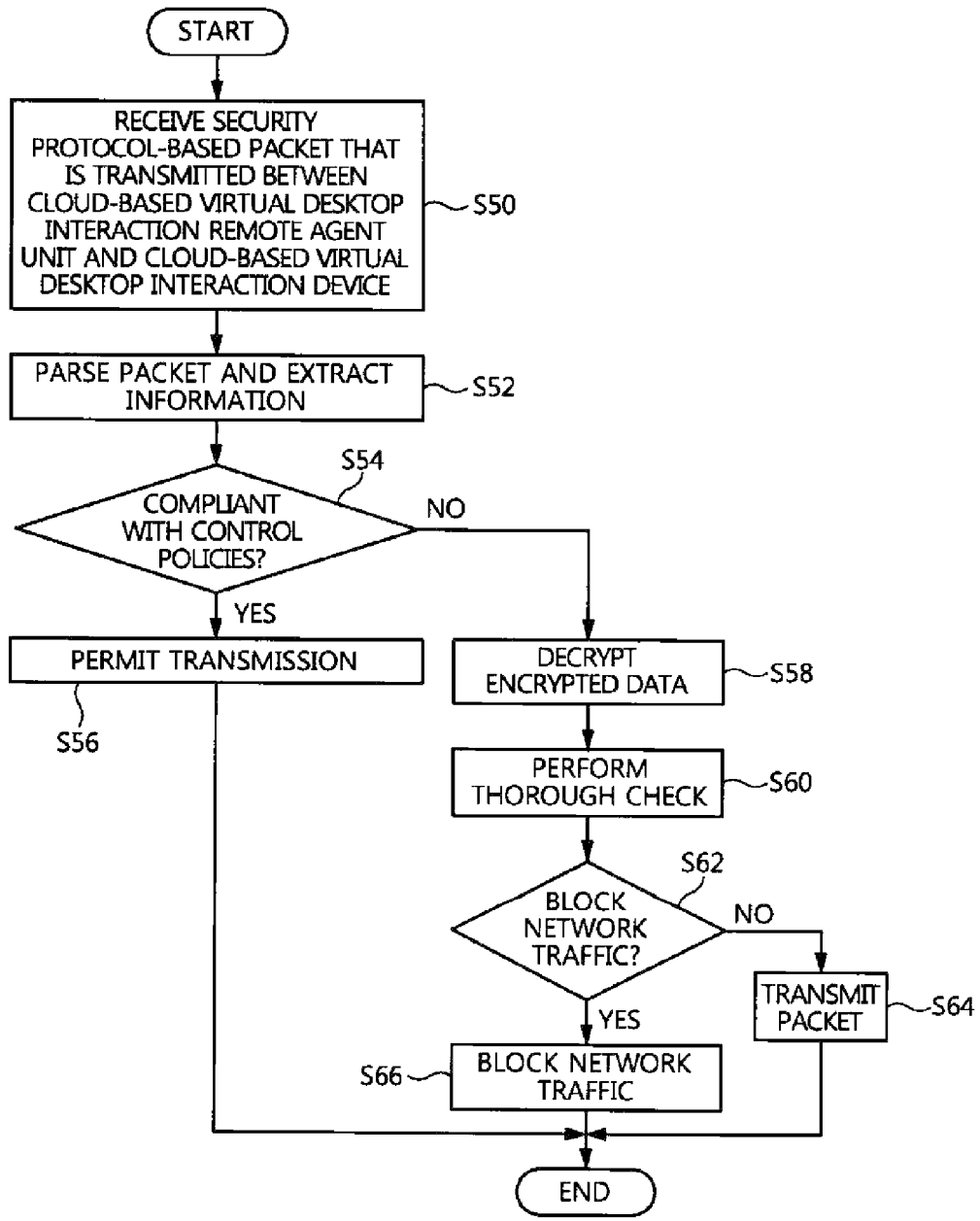
FIG. 6 is a flowchart showing a security control method for a cloud-based virtual desktop according to an embodiment of the present invention.

FIG. 6 is a flowchart showing a security control method for a cloud-based virtual desktop according to an embodiment of the present invention. The security control method for a cloud-based virtual desktop described in FIG. 6 may be regarded as an operation performed by the security controller 20.

First, the security controller 20 receives a security protocol-based packet 40 (that is, a packet including a protocol control header and encrypted data) that is transmitted between the cloud-based virtual desktop interaction remote agent unit 10 and the virtual machine 31 of the cloud-based virtual desktop interaction device 30 at step S50. That is, the network control unit 22 will receive the security protocol-based packet 40 through the NIC 21 of the security controller 20. The network control unit 22 transfers the received security protocol-based packet 40 to the protocol parsing unit 23. In this case, the network control unit 22 prevents the transmission of the corresponding packet and waits until the results of the checking are received from the policy checking unit 24 and/or the security solution interaction unit 26.

The protocol parsing unit 23 extracts information (that is, the information of the protocol control header and encrypted data) by parsing the packet 40 so as to check network traffic communicated using the security protocol at step S52. The protocol parsing unit 23 sends the extracted information to the policy checking unit 24.

The policy checking unit 24 checks whether the network traffic is compliant with control policies, based on the received information at step S54. For example, the policy checking unit 24 may check whether current network traffic is compliant with the control policies, based on the information of the protocol control header.

As a result of the checking, if the current network traffic is compliant with the control policies, the policy checking unit 24 sends a message indicative of permission of transmission to the network control unit 22. Accordingly, the network control unit 22 transmits the corresponding packet 40 at step S56.

In contrast, if the current network traffic is not compliant with the control policies as a result of the checking of the policies by the policy checking unit 24, the policy checking unit 24 transmits the encrypted data included in the packet 40 to the decryption unit 25 so as to perform a thorough check. Accordingly, the decryption unit 25 decrypts the encrypted data at step S58. The decrypted data is send to the security solution interaction unit 26.

Thereafter, the security solution interaction unit 26 transfers the decrypted data to the malicious file identification solution 28, the data leakage prevention solution 29, and the additional security solution, and receives the results thereof. Accordingly, the security solution interaction unit 26 determines whether to block the network traffic, based on the results obtained from the malicious file identification solution 28, the data leakage prevention solution 29, and the additional security solution at step S60.

If it is determined that there is no need to block the network traffic ("No" at step S62), the security solution interaction unit 26 sends the results of the determination to the network control unit 22, and then the network control unit 22 does not block the corresponding network traffic. In this case, the packet 40 is transmitted at step S64.

In contrast, if it is determined that the network traffic is to be blocked ("Yes" at step S62), the security solution interaction unit 26 transmits the results of the determination to the network control unit 22, and thus the network control unit 22 blocks the corresponding network traffic at step S66.

In accordance with the present invention, there is an advantage in that the flow of malicious code into a cloud can be blocked in a cloud-based virtual desktop service environment, and the leakage of unauthorized data to the outside of the cloud can be prevented in a cloud service.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A security control apparatus for a cloud-based virtual desktop, comprising:
    a network control unit for receiving a security protocol-based packet that includes a protocol control header and data, wherein the protocol control header includes a type of data, a hash value of a file, user authority information, user environment information, a protocol name, a protocol virtual channel, a data size, a packet identifier (ID), and clipboard information or printing information, and that is transmitted to and from a cloud-based virtual desktop interaction remote agent unit and a virtual machine of a cloud-based virtual desktop interaction device and blocking network traffic between cloud-based virtual desktop interaction remote agent unit and the virtual machine, depending on received results of checking;
    a policy checking unit for checking whether the clipboard or printing information extracted from the security protocol-based packet is compliant with control policies, wherein the control policies are classified by Internet Protocol (IP), user, and usable function, and transmitting results of checking to the network control unit;
    a decryption unit for decrypting encrypted data and transmitting the decrypted data to a security solution interaction unit when the data is encrypted data and the clipboard or printing information is compliant with control policies; and
    the security solution interaction unit for transmitting the decrypted data to a clipboard solution or a printing solution when it is determined by the policy checking unit that the clipboard or printing information is compliant with the control policies, and transmitting the clipboard or printing information extracted from the security protocol-based packet to an external security solution when it is determined by the policy checking unit that the clipboard or printing information is not compliant with the control policies, and transmitting results of checking by a corresponding security solution to the network control unit, wherein the external security solution includes a malicious file identification solution and a data leakage prevention solution.

2. The security control apparatus of claim 1, wherein the policy checking unit is configured to, if the clipboard or printing information extracted from the security protocol-based packet is compliant with the control policies, transmit checking results indicative of permission of transmission of the network traffic to the network control unit.

3. The security control apparatus of claim 1, wherein the policy checking unit is configured to, if the clipboard or printing information extracted from the security protocol-based packet is not compliant with the control policies, transmit checking results indicative of blocking of the network traffic to the network control unit.

4. The security control apparatus of claim 1, wherein the network control unit prevents transmission of the security protocol-based packet and waits until the results of the checking are received.

5. The security control apparatus of claim 1, further comprising a protocol parsing unit for parsing the security protocol-based packet, extracting the protocol control header information and the data, and transmitting the extracted protocol control header information and data to the policy checking unit.

6. A security control method for a cloud-based virtual desktop, comprising:
    receiving, by a network control unit, a security protocol-based packet that includes a protocol control header and data, wherein the protocol control header includes a type of data, a hash value of a file, user authority information, user environment information, a protocol name, a protocol virtual channel, a data size, and a packet identifier (ID), clipboard information or printing information, and that is transmitted to and from a cloud-based virtual desktop interaction remote agent unit and a virtual machine of a cloud-based virtual desktop interaction device;
    checking, by a policy checking unit, whether the clipboard or printing information extracted from the security protocol-based packet is compliant with control policies, wherein the control policies are classified by Internet Protocol (IP), user, and usable function, and transmitting results of checking to the network control unit;
    decrypting encrypted data and transmitting the decrypted data to a security solution interaction unit when the data is encrypted data and the clipboard or printing information is compliant with control policies;
    transmitting, by the security solution interaction unit, the decrypted data to a clipboard solution or a printing solution when it is determined by the policy checking unit that the clipboard or printing information is compliant with the control policies, and
    if it is checked by the policy checking unit that the extracted information is not compliant with the control policies, transmitting, by the security solution interaction unit, the information extracted from the security protocol-based packet to an external security solution, and transmitting, by the security solution interaction unit, results of checking by a corresponding security solution to the network control unit; and blocking, by the network control unit, network traffic between the cloud-based virtual desktop interaction remote agent unit and the virtual machine, depending on results of checking received from the policy checking unit or the security solution interaction unit, wherein the external security solution includes a malicious file identification solution and a data leakage prevention solution.

7. The security control method of claim 6, wherein checking whether the clipboard or printing information extracted from the security protocol-based packet is compliant with the control policies and when the clipboard or printing information extracted from the security protocol-based packet is compliant with the control policies transmitting checking results indicative of permission of transmission of the network traffic to the network control unit.

8. The security control method of claim 6, wherein checking whether the clipboard and printing information extracted from the security protocol-based packet is compliant with the control policies and when the clipboard or printing information extracted from the security protocol-based packet is not compliant with the control policies, transmitting checking results indicative of blocking of the network traffic to the network control unit.

9. The security control method of claim 6, wherein receiving the security protocol-based packet comprises preventing transmission of the security protocol-based packet and waiting until the results of the checking are received.

10. The security control method of claim 6, further comprising, after receiving the security protocol-based packet:

parsing the security protocol-based packet, extracting the protocol control header information and the data, and transmitting the extracted protocol control header information and data to the policy checking unit.

\* \* \* \* \*